United States Patent
Okada et al.

(10) Patent No.: US 9,485,411 B2
(45) Date of Patent: Nov. 1, 2016

(54) DISPLAY CONTROL APPARATUS AND METHOD FOR CONTROLLING DISPLAY CONTROL APPARATUS

(71) Applicant: CANON KABUSHIKI KAISHA, Tokyo (JP)

(72) Inventors: Koichi Okada, Kunitachi (JP); Koichi Nakagawa, Kawasaki (JP); Soichiro Shigeeda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 226 days.

(21) Appl. No.: 13/658,230

(22) Filed: Oct. 23, 2012

(65) Prior Publication Data
US 2013/0111410 A1 May 2, 2013

(30) Foreign Application Priority Data

Oct. 28, 2011 (JP) ................. 2011-237500
Oct. 28, 2011 (JP) ................. 2011-237501

(51) Int. Cl.
| | | |
|---|---|---|
| G06F 3/048 | (2013.01) | |
| H04N 5/232 | (2006.01) | |
| G06F 3/0482 | (2013.01) | |
| G06F 3/0487 | (2013.01) | |
| G06F 3/0489 | (2013.01) | |

(52) U.S. Cl.
CPC ........ *H04N 5/23216* (2013.01); *G06F 3/0482* (2013.01); *G06F 3/0487* (2013.01); *G06F 3/0489* (2013.01)

(58) Field of Classification Search
None
See application file for complete search history.

(56) References Cited

U.S. PATENT DOCUMENTS

| | | | | |
|---|---|---|---|---|
| 5,208,910 | A | * | 5/1993 | Higgins et al. ............... 715/820 |
| 5,760,776 | A | * | 6/1998 | McGurrin et al. ............ 715/841 |
| 2002/0105549 | A1 | | 8/2002 | Yokota |
| 2003/0090471 | A1 | * | 5/2003 | Slaunwhite et al. .......... 345/172 |
| 2004/0051741 | A1 | * | 3/2004 | Venturino ..................... 345/812 |
| 2004/0179122 | A1 | | 9/2004 | Morimoto |
| 2005/0054381 | A1 | | 3/2005 | Lee |
| 2007/0157127 | A1 | * | 7/2007 | Moehrle ....................... 715/853 |
| 2007/0162898 | A1 | * | 7/2007 | Ramani et al. ............... 717/135 |
| 2007/0240073 | A1 | | 10/2007 | McCarthy |

(Continued)

FOREIGN PATENT DOCUMENTS

| | | |
|---|---|---|
| CN | 101285880 A | 10/2008 |
| EP | 1667013 A2 | 6/2006 |

(Continued)

OTHER PUBLICATIONS

IBM Technical Disclosure Bulletin, User Interface Shortcut, International Business Machines Corp., Aug. 1, 1990, vol. 33, No. 3A, pp. 413-414, XP000120530.

*Primary Examiner* — William Trapanese
(74) *Attorney, Agent, or Firm* — Canon USA, Inc. IP Division

(57) ABSTRACT

Processing for pressing a shortcut key to close a menu and processing for pressing the same shortcut key to enter a specific menu are made compatible. A specific menu among hierarchical menus including a plurality of menus for making a setting or an operation instruction about a display control apparatus is assigned to a specific operation unit. If the specific operation unit is operated when the specific menu is displayed, display of the menu is cleared. If the specific operation unit is operated when a menu different from the specific menu and a menu one level above the specific menu is displayed, the specific menu is displayed.

32 Claims, 8 Drawing Sheets

(56) References Cited

U.S. PATENT DOCUMENTS

| | | | |
|---|---|---|---|
| 2010/0005419 A1* | 1/2010 | Miichi et al. | 715/828 |
| 2011/0016425 A1 | 1/2011 | Homburg | |

FOREIGN PATENT DOCUMENTS

| | | |
|---|---|---|
| EP | 2214175 A1 | 8/2010 |
| EP | 2334059 A1 | 6/2011 |
| EP | 2381353 A1 | 10/2011 |
| JP | H04-207694 A | 7/1992 |
| JP | 2000-305701 A | 11/2000 |
| JP | 2004-135271 A | 4/2004 |
| JP | 2004-274500 A | 9/2004 |
| JP | 2005-221771 A | 8/2005 |
| JP | 2008-203910 A | 9/2008 |
| JP | 2008203910 A | 9/2008 |
| KR | 10-2007-0023390 A | 2/2007 |

\* cited by examiner

DISPLAY CONTROL APPARATUS AND METHOD FOR CONTROLLING DISPLAY CONTROL APPARATUS

BACKGROUND OF THE INVENTION

1. Field of the Invention

The present invention relates to a display control apparatus, a method for controlling a display control apparatus, and a recording medium storing a program.

2. Description of the Related Art

Devices such as digital cameras, digital video cameras, and mobile phones have recently become more sophisticated and diversified in functions. The functions have ever been bloated. As the functions are bloated, user interfaces for a user to use are bloated. For example, hierarchical menus typically known as a user interface are becoming hierarchically deeper and their menu items are increasing in number. As a result, the user needs to descend many hierarchical levels and scroll many screens before reaching an intended menu item. Accordingly, there is a problem that there are many operations to reach an intended menu item, so that it takes time.

In view of such a problem, Japanese Patent Application Laid-Open No. 2008-203910 discusses an information recording and reproducing apparatus that includes an external key to which a function can be freely assigned according to a user's preference. A shortcut function for directly opening a specific menu screen may be assigned to the external key, in which case a menu to be repeatedly used can be displayed by a single key operation with improved usability.

Japanese Patent Application Laid-Open No. 2008-203910 discusses the operation of the information recording and reproducing apparatus when a menu screen is opened, but no subsequent operations. For example, the usability is considered to improve if a shortcut key can be used to open a menu to check or modify settings and then the same shortcut key can be used to close the menu. When a menu is open and the user wishes to open a desired menu by operating a shortcut key, then the usability is considered to improve if the desired menu can be opened.

As described above, different operations are sometimes expected of the same key depending on the operating situation. The usability improves if such operations can be made compatible.

SUMMARY OF THE INVENTION

The present invention is directed to a display control apparatus that includes a shortcut key of improved operability. According to an aspect of the present invention, there is provided a display control apparatus which can make processing for, when a menu is open, pressing a shortcut key to close the menu compatible with processing for pressing the same shortcut key to open a specific menu.

According to an aspect of the present invention, a display control apparatus includes a specific operation unit configured to display a specific menu among hierarchical menus including a plurality of menus for making a setting or an operation instruction about the display control apparatus; and a display control unit configured to perform control, if the specific operation unit is operated when the specific menu is displayed on a display unit, to clear display of the menu, and if the specific operation unit is operated when a menu different from the specific menu and a menu one level above the specific menu is displayed, to display the specific menu.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

DESCRIPTION OF THE EMBODIMENTS

Various exemplary embodiments, features, and aspects of the invention will be described in detail below with reference to the drawings.

In the present exemplary embodiment, a display control apparatus is described by using a digital video camera as an example.

Figure 1:
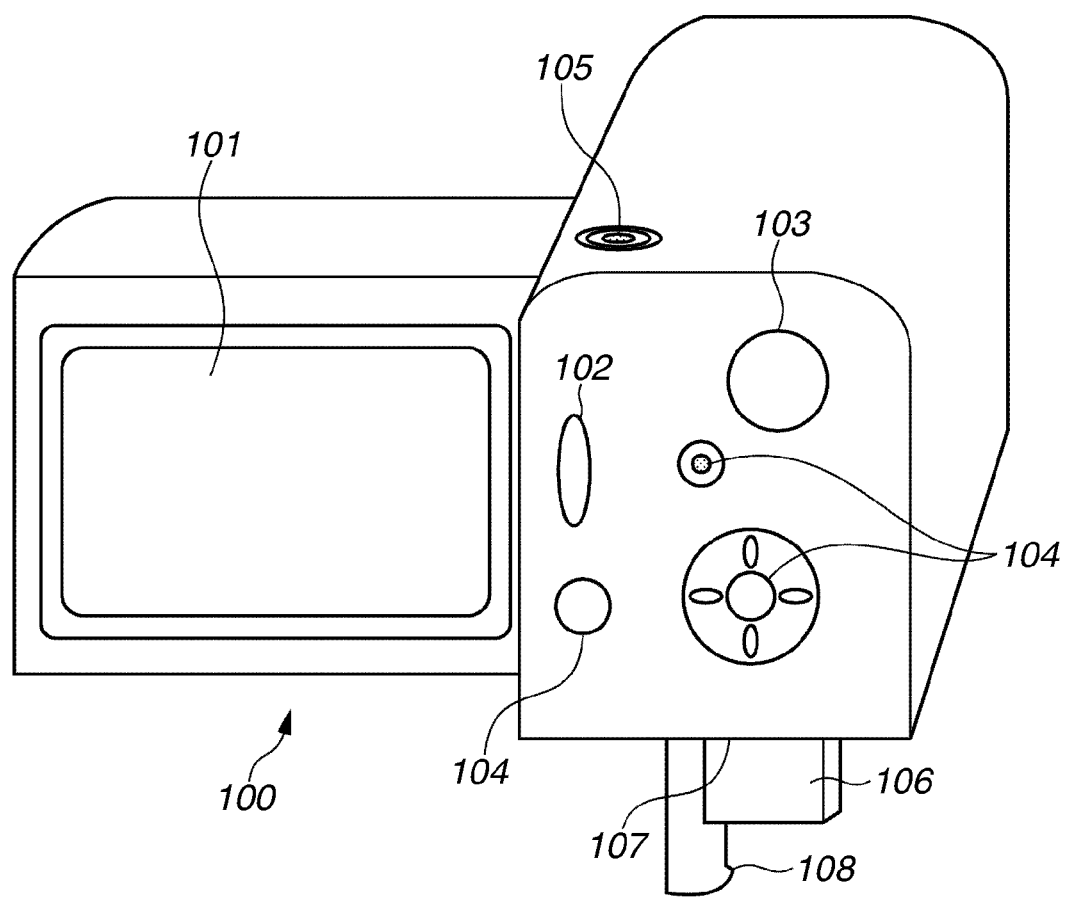
FIG. 1 is a diagram illustrating the appearance configuration of a display control apparatus.

A first exemplary embodiment will be described. The digital video camera according to the first exemplary embodiment operates, in response to pressing down a shortcut key, to display a menu assigned to the shortcut key, and when the menu is displayed, in response to pressing down the shortcut key, to close (clear the display of) the displayed menu. FIG. 1 is a diagram illustrating the appearance configuration of the digital video camera 100. The digital video camera 100 includes a display unit 101, a shooting button 102, a mode change switch 103, an operation unit 104, a power switch 105, a recording medium 106, a recording medium slot 107, and a lid 108.

The display unit 101 displays images and various types of information. The shooting button 102 is a button for the user to make a shooting instruction. The mode change switch 103 is a switch for the user to change the operation mode of the digital video camera 100. The mode change switch 103 will be described in detail later. The operation unit 104 includes operation members for accepting various user operations such as various switches, buttons, and a touch panel. The power switch 105 is used to power on/off the digital video camera 100. Examples of the recording medium 106 include a semiconductor memory, a memory card, a magnetic disk, and a hard disk. The recording medium slot 107 is a slot for the recording medium 106 to be inserted into. The recording medium 106 inserted in the recording medium slot 107 can communicate with the digital video camera 100 and records video images captured by the digital video camera 100. The lid 108 closes the recording medium slot 107.

Figure 2:
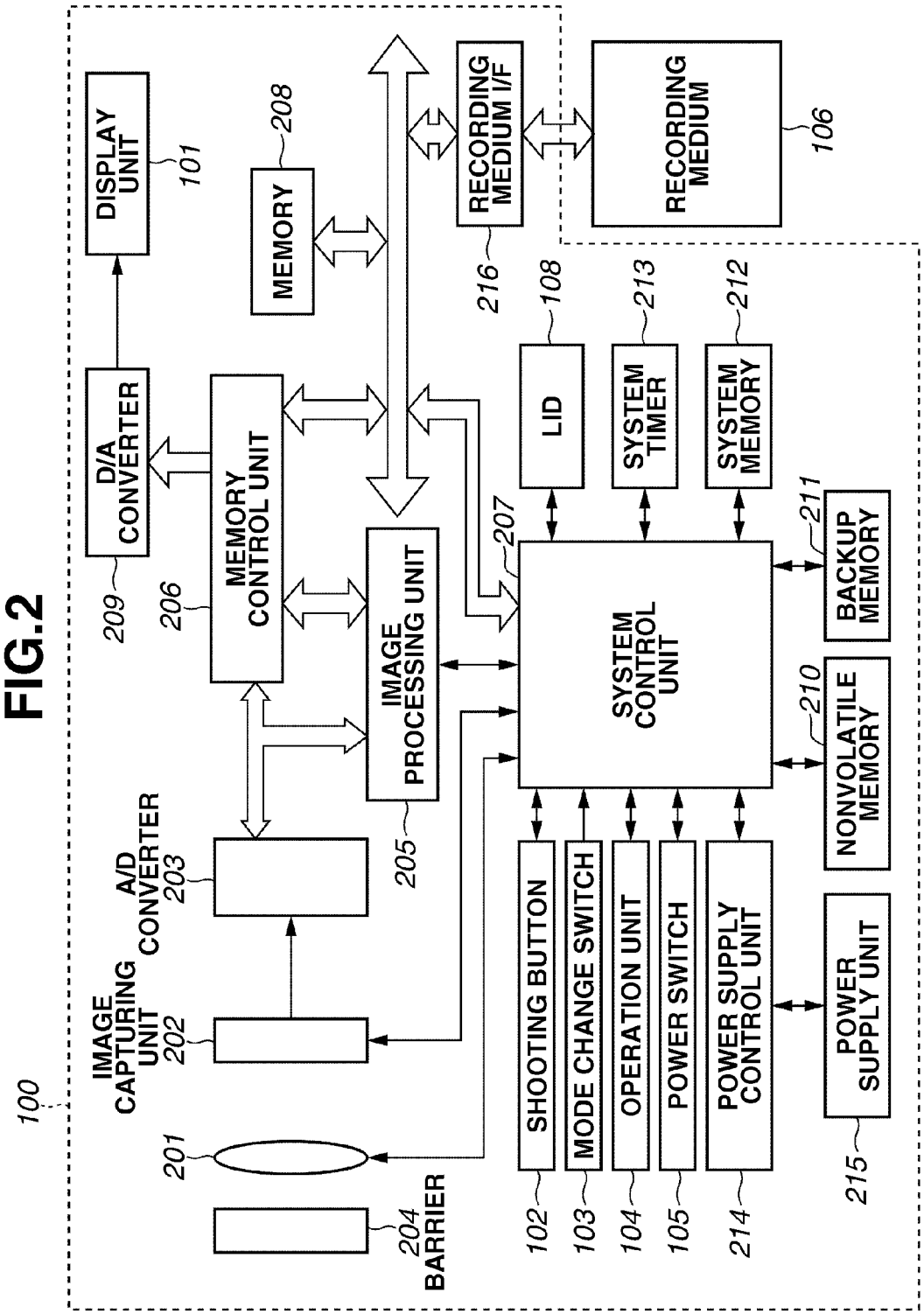
FIG. 2 is a block diagram illustrating the configuration of the display control apparatus.

FIG. 2 is a block diagram illustrating the configuration of the digital video camera 100. The same components as those of FIG. 1 will be designated by the same reference numerals. Description thereof will be omitted where appropriate. The digital video camera 100 includes a shooting lens 201, an image capturing unit 202, an analog-to-digital (A/D) converter 203, a barrier 204, an image processing unit 205, a memory control unit 206, a system control unit 207, a memory 208, and a digital-to-analog (D/A) converter 209. The digital video camera 100 further includes a nonvolatile memory 210, a backup memory 211, a system memory 212, a system timer 213, a power supply control unit 214, a power supply unit 215, and a recording medium interface (I/F) 216.

The shooting lens 201 is a lens unit including a zoom lens and a focus lens. The image capturing unit 202 is an image sensor including a charge-coupled device (CCD) or complementary metal oxide semiconductor (CMOS) sensor for converting an optical image into an electrical signal. The A/D converter 203 converts an analog signal output from the image capturing unit 202 into a digital signal. The barrier 204 covers an imaging optical system including the shooting lens 201 of the digital video camera 100, to prevent the imaging optical system including the shooting lens 201 and the image capturing unit 202 from becoming dirty and being damaged.

The image processing unit 205 performs predetermined resize processing, such as pixel interpolation and reduction, and color conversion processing on image data from the A/D converter 203 or image data from the memory control unit 206. The image processing unit 205 further performs predetermined arithmetic processing by using captured image data. The system control unit 207 performs an exposure control and a ranging control based on the result of the arithmetic processing. The image processing unit 205 also performs predetermined arithmetic processing by using the captured image data and performs an automatic white balance (AWB) processing based on the result of the arithmetic processing.

The image data from the A/D converter 203 is written to the memory 208 via the image processing unit 205 and the memory control unit 206 or directly via the memory control unit 206. The memory 208 stores the image data that is acquired by the image capturing unit 202 and converted into digital data by the A/D converter 203, and image data to be displayed on the display unit 101. The memory 208 has a storage capacity sufficient to store a predetermined number of still images and a predetermined duration of moving images and sound. The memory 208 also serves as a memory for image display (video memory). The D/A converter 209 converts display image data stored in the memory 208 into an analog signal, and supplies the analog signal to the display unit 101. The display image data written in the memory 208 is displayed on the display unit 101 via the D/A converter 209.

The display unit 101 displays an image on a monitor such as a liquid crystal display (LCD) according to the analog signal from the D/A converter 209. The digital signal that is once A/D-converted by the A/D converter 203 and stored in the memory 208 may be converted into the analog signal by the D/A converter 209 and sequentially transferred to the display unit 101 for display. The display unit 101 can thus function as an electronic viewfinder to display a through-the-lens image.

The nonvolatile memory 210 is an electrically erasable and recordable memory. Examples include an electrically erasable programmable read-only memory (EEPROM). The nonvolatile memory 210 records constants and a program intended for the operation of the system control unit 207. The program is one for executing the variety of flowcharts of the present exemplary embodiment to be described later. The backup memory 221 is an electrically erasable and recordable memory. Examples include an EEPROM and a static random access memory (SRAM). The backup memory 211 records user setting information.

The system control unit 207 controls the entire digital video camera 100. The system control unit 207 executes the foregoing program recorded in the nonvolatile memory 210 to implement each of the processing of the present exemplary embodiment to be described later. An example of the system memory 212 is a random access memory (RAM). Constants and variables intended for the operation of the memory control unit 207 and the program read from the nonvolatile memory 210 are loaded into the system memory 212. The system control unit 207 also controls the memory 208, the D/A converter 209, and the display unit 101 for display control.

The system timer 213 is a time measuring unit for measuring time used for various controls and the time of a built-in clock. The shooting button 102, the mode change switch 103, and the operation unit 104 are intended to input various operation instructions to the system control unit 207. The shooting button 102 and the mode change switch 103 may be configured as a part of the operation unit 104. The mode change switch 103 is a switch for changing the operation mode of the system control unit 207 to any one of modes including shooting modes (still image shooting mode and moving image shooting mode) and a playback mode. The still image shooting mode includes an automatic shooting mode, an automatic scene determination mode, a manual mode, various scene modes, a programmed automatic exposure (AE) mode, and a custom mode. The various scene modes include photographing settings for respective shooting scenes. The mode change switch 103 can be used to directly switch to any one of the foregoing modes included in the still image shooting mode. A different operation member may be configured to be used, once the operation mode is switched to the still image shooting mode by using the mode change switch 103, to switch to any one of the modes included in the still image shooting mode. The moving image shooting mode may similarly include a plurality of modes.

When the shooting button 102 is pressed, the system control unit 207 starts a series of shooting processing operations from the reading of the signal from the image capturing unit 202 to the writing of the image data into the recording medium 106. When various function icons displayed on the display unit 101 are selected and operated, scene-specific different functions are assigned to each of the operation members of the operation unit 104. The operation members thus function as various function keys. Examples of the function keys include an end key, a return key, an image advancing key, a jump key, a narrow-down key, an attribute change key, a shortcut key, and a menu key. For example, the menu key is pressed to display various settable menus on the display unit 101. The user can intuitively make various settings by using the menus displayed on the display unit 101, up, down, right, and left arrow keys, and a set key.

The shortcut key is an operation member for opening a specific menu among hierarchically structured menus according to the present exemplary embodiment. More than one shortcut key may be provided. Different menus can be assigned to the respective plurality of shortcut keys. The menu key is an operation member for opening a top menu (menu of the highest hierarchy) among the hierarchically structured menus, or the same menu as the one closed last time. As employed herein, the various keys are described as operation members arranged on the exterior of the digital video camera 100. Similar effects can be obtained by operating soft keys on a touch panel.

The power supply control unit 214 includes a battery detection circuit, a direct-current-to-direct-current (DC-DC) converter, and a switch circuit for switching blocks to energize. The power supply control circuit 214 detects whether a battery is attached, the type of the battery, and the remaining battery capacity. Based on the detection results and an instruction from the system control unit 207, the power supply control unit 214 controls the DC-DC converter to supply necessary voltages to various components including the recording medium 106 for necessary periods. The power supply unit 215 includes a primary battery such as an alkali battery and a lithium battery, a secondary battery such as a nickel-cadmium (NiCd) battery, a nickel metal halide (NiHM) battery, and a lithium (Li) battery, and/or an alternating-current (AC) adapter. The recording medium I/F 216 is an interface with the recording medium 106.

Next, menus for making various settings and operation instructions about the digital video camera 100, used in the present exemplary embodiment, will be described. The menus used in the present exemplary embodiment are menus of hierarchical type (hierarchical menus) whose settable items are classified according to the types of the functions. The menus of hierarchical type include grouped lower level menus and higher level menus including menu items that are entrances to the lower level menus. For example, the menu of the highest hierarchy (first level), or top menu, includes menu items "camera setup," "audio setup," "video setup," "other functions," and "custom menu."

If the user selects the menu item "other functions" on the top menu, a menu one level below the top menu (second level menu), "other functions," is displayed. For example, the menu "other functions" includes menu items "reset," "time zone," "clock set," "WFM," "language," and "wireless controller." The menu "other functions" further includes menu items such as "tally lamp," "media access LED," "NTSC/PAL," "bit rate/resolution," and "frame rate."

If the user selects the menu item "reset" included in the second level menu, a menu yet one level below (third level menu), "reset," is displayed. For example, the menu "reset" includes menu items "CF-A," "CF-B," and "SD-CARD." In other words, the menu "reset" is a menu for selecting a recording medium to initialize from a CompactFlash (CF) card A, a CF card B, or a Secure Digital (SD) card. If the user selects the menu item "SD-CARD" included in the third level menu, a menu yet one level below (fourth level menu), "SD-CARD," is displayed. For example, the menu "SD-CARD" includes menu items "execute" and "cancel" as setting value candidates. The user selects and determines either one of the setting value candidates, and the operation or setting indicated by the setting value candidate is executed. For example, if the user instructs an "execute" on the menu "SD-CARD," an SD card among a plurality of recording media 106 mounted on the digital video camera 100 is initialized (formatted). There is no level below the menu "SD-CARD," and the menu "SD-CARD" is a menu of the lowest hierarchy.

Figure 3A:
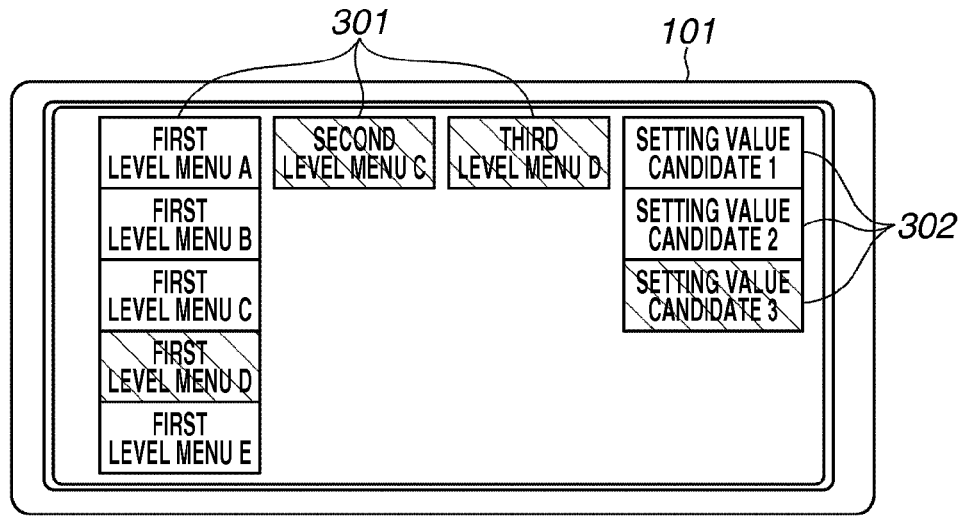
FIGS. 3A, 3B, and 3C are diagrams illustrating display examples of a menu screen.
Figure 3B:
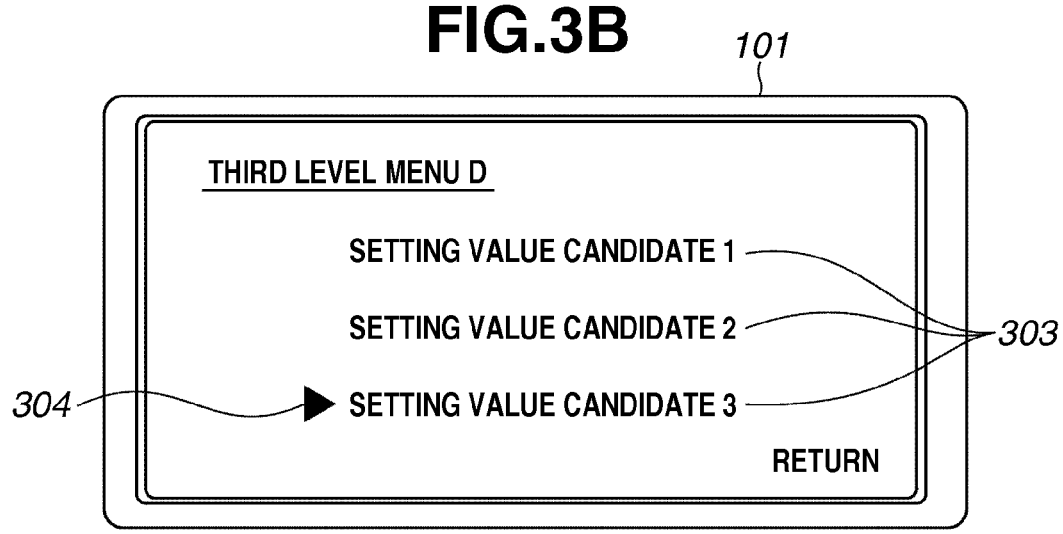
Figure 3C:
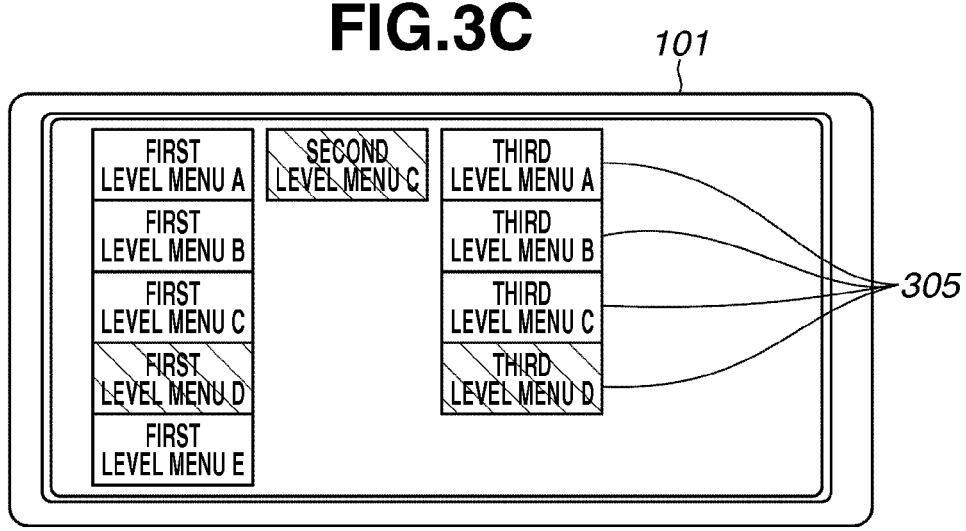

FIGS. 3A to 3C are diagrams illustrating display examples of a menu screen displayed on the display unit 101. FIG. 3A illustrates a display example when displaying menus of lower hierarchy, where menu items of higher hierarchy leading to the menus of lower hierarchy are displayed. In FIG. 3A, menu items 301 of the respective levels and setting value candidates 302 settable on the third level menu D are displayed. In FIG. 3A, some items are displayed with hatching. The hatching indicates that the first level menu D, the second level menu C, and the third level menu D are selected in this order, and the setting value candidate 3 is selected from the setting value candidates 1 to 3 constituting the third level menu D. This menu screen illustrates a menu for selecting any one of the setting value candidates 1 to 3, i.e., the third level menu D of the lowest hierarchy.

FIG. 3 illustrates another display example of the menu screen, where the name of the menu of the lowest hierarchy and a list of the setting value candidates 303 as menu items are displayed. In FIG. 3B, setting value candidates 303 settable on the third level menu D and a cursor 304 for indicating the selected setting value candidate 303 are displayed. The menu name coincides with the name of the menu item 301 that is on the menu one level above and intended to open the menu of the lowest hierarchy. Unlike FIG. 3A, FIG. 3B illustrates a display example where the menu items 301 of higher hierarchy leading to the menus of lower hierarchy are not displayed.

FIG. 3C illustrates another display example of the menu screen, where menu items 305 on the second level menu C one level above the third level menu D are displayed. In FIG. 3C, the menu items 305 on the second level menu C are alternatives for selecting third level menus A to D of the same hierarchy as that of the third level menu D. When processing on the third level menu D illustrated in FIG. 3A is executed or cancelled to proceed to the menu one level above, the second level menu C one level above is displayed with the menu item 305 of the third level menu D having been operated selected.

In the digital video camera 100 according to the present exemplary embodiment, anyone of the menus of the lowest hierarchy can be assigned to each of a plurality of shortcut keys. When the user presses a shortcut key to which a menu of the lowest hierarchy is assigned, the assigned menu can be immediately opened. For example, if the user presses a shortcut key to which the third level menu D is assigned, a menu screen like illustrated in FIG. 3A or 3B is displayed. As a result, the operations of descending the hierarchy from the top menu to open the third level menu D can be omitted to quickly open the desired menu.

Next, a method (registration method) for assigning a menu to a shortcut key will be described. The user initially operates the operation unit 104 to select a menu item "assign" which is included in any one of the menus. The system control unit 207 displays alternatives as setting value candidates for selecting which shortcut key to assign a menu. Suppose, for example, that "shortcut key A," "shortcut key B," and "shortcut key C" are displayed as the alternatives. Next, the user uses the arrow keys to select the shortcut key to assign a menu to, and presses the set key. The menu control unit 207 displays a menu for selecting which menu to assign to the selected shortcut key. The displayed menu is generally similar to the foregoing top menu.

The user operates the operation unit 104 to proceed from the displayed menu to a menu or menus of lower hierarchy, and presses the set key with the desired menu of the lowest hierarchy selected. The system control unit 207 assigns the selected menu to the shortcut key, and records the association between the menu and the shortcut key into the backup memory 211 as shortcut function information. The shortcut function information recorded in the backup memory 211 is recorded into the nonvolatile memory 210 before the system control unit 207 powers off the digital video camera 100. The same assignment is thus reproduced next time the digital video camera 100 is powered on.

Figure 4:
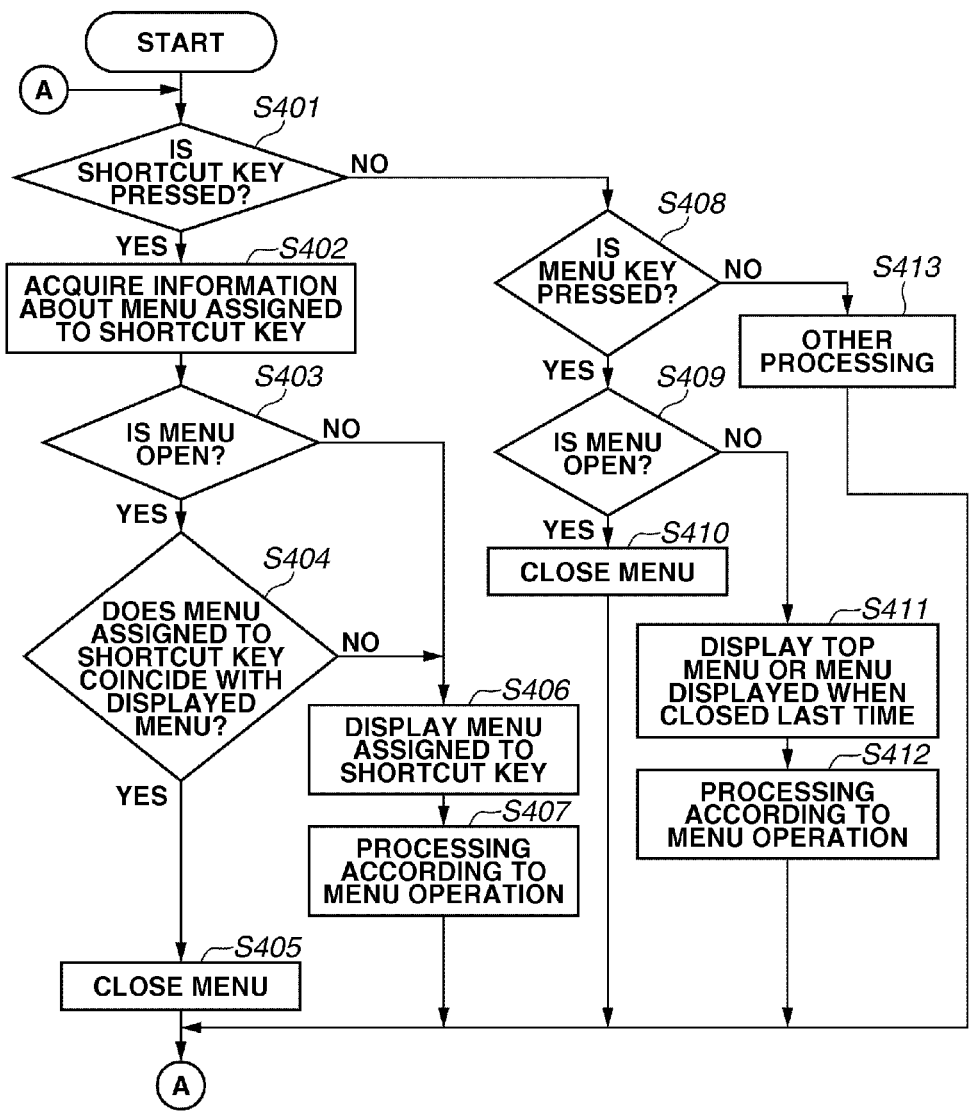
FIG. 4 is a flowchart illustrating menu display processing according to a first exemplary embodiment.

Next, the operation of the digital video camera 100 for using a shortcut key to which a menu is assigned as described above to improve the usability of menu operations will be described. FIG. 4 is a flowchart illustrating menu display processing according to the first exemplary embodiment. Each of the processes of the flowchart is implemented by the system control unit 207 loading the program recorded in the nonvolatile memory 210 into the system memory 212 and executing the program.

In step S401, the system control unit 207 detects whether the user presses a shortcut key of the operation unit 104. If the system control unit 207 detects that any one of the plurality of shortcut keys is pressed (YES in step S401), the system control unit 207 proceeds to step S402. On the other hand, if the system control unit 207 does not detect that a shortcut key is pressed but detects an operation other than on the shortcut keys (NO in step S401), the system control unit 207 proceeds to step S408. Note that a menu may already be open before step S401.

In step S402, the system control unit 207 acquires information about the menu that is assigned to the shortcut key pressed in step S401 from the shortcut function information stored in the backup memory 211. The system control unit 207 then proceeds to step S403. In step S403, the system control unit 207 detects whether a menu is open. If any menu is open (YES in step S403), the system control unit 207 proceeds to step S404. If no menu is open (NO in step S403), the system control unit 207 proceeds to step S406.

In step S404, the system control unit 207 compares the menu assigned to the shortcut key acquired in step S402 with the currently displayed menu to determine whether the two menus coincide. If the two menus coincide (YES in step S404), the system control unit 207 proceeds to step S405. If not (NO in step S404), the system control unit 207 proceeds to step S406.

In step S405, the system control unit 207 closes the currently displayed menu, makes other display, and ends the processing based on the shortcut key. As employed herein, making other display refers to returning to a state of display before the menu is opened, for example. In step S406, the system control unit 207 displays the menu assigned to the shortcut key acquired in step S402. For example, if the third level menu D is assigned to the pressed shortcut key, a menu screen like illustrated in FIG. 3A or 3B is displayed on the display unit 101.

In step S407, the system control unit 207 performs processing according to operations the user makes via the operation unit 104 (menu operations). More specifically, when the user operates the up and down of the arrow keys to select a menu item and presses the set key, the system control unit 207 executes the selected menu item. If the selected menu item is a menu of the lowest hierarchy, the system control unit 207 reflects the setting value or executes an operation instruction indicated by the menu item. If the selected menu item is not a menu of the lowest hierarchy, the system control unit 207 opens the menu of lower hierarchy corresponding to the selected menu item. If the selected menu item is a return button, the system control unit 207 opens a menu of higher hierarchy.

In step S408, the system control unit 207 detects whether the user presses the menu key of the operation unit 104. If the system control unit 207 detects that the menu key is pressed (YES in step S408), the system control unit 207 proceeds to step S409. If the system control unit 207 does not detect that the menu key is pressed (NO in step S408), the system control unit 207 proceeds to step S413 and performs other processing. In step S409, the system control unit 207 determines whether a menu is already open. If a menu is already open (YES in step S409), the system control unit 207 proceeds to step S410. If no menu is open (NO in step S409), the system control unit 207 proceeds to step S411.

In step S410, the system control unit 207 closes the menu. The system control unit 207 performs the processing for closing a menu no matter which level or which menu. In other words, when the menu key is pressed, the system control unit 207 performs the processing for closing a menu regardless of the level of the displayed menu. In step S411, the system control unit 207 displays the top menu or the menu previously displayed when closed last time. Specifically, if the user presses the menu key for the first time after the digital video camera 100 is powered on, the system control unit 207 opens the top menu. If not, the system control unit 207 opens the menu that was previously displayed when closed last time. For the sake of such processing, the system control unit 207, when closing a menu, records the information about the menu previously displayed into the system memory 212. In step S412, the system control unit 207 then performs processing according to menu operations.

As described above, according to the first exemplary embodiment, the operation to be performed when a shortcut key is pressed is switched depending on whether the menu indicated by the shortcut function information recorded in the backup memory 211 coincides with the currently displayed menu. An identical shortcut key can thus be used to perform both the operation for opening a menu and the operation for closing a menu. For example, the user can press a predetermined shortcut key to open a desired menu, simply check which setting value candidate is selected, i.e., check the current setting, and press the shortcut key again to close the menu without any other operations. By such an operation, the user can perform the operation for opening a menu related to a frequently used setting, checking the setting, and closing the menu without moving the finger from the shortcut key. This enables quick, simple operations. Since the user need not move the finger from the shortcut key, the user need not visually check the operation unit 104 and can continue watching the display unit 101 during the operation. If the user has pressed a shortcut key to open a menu, moved to another level, and opened a different menu, then the user can press the shortcut key to quickly enter the menu assigned to the shortcut key.

When a shortcut key is pressed, various settings on the menu assigned to the pressed shortcut key are sometimes not able to be immediately made (disabled). In such a case, the system control unit 207 opens a menu one level above the menu assigned to the shortcut key, and displays recognizably to the user that the menu item for opening the menu assigned to the shortcut key is disabled. Here, the system control unit 207 displays the disabled menu item in a different display form like grayout. For example, suppose that a shortcut key is assigned to the foregoing menu "SD-CARD" and there is no SD card inserted. In such a case, settings about the menu "SD-CARD" cannot be made. The system control unit 207 thus opens the menu "reset" one level above the menu "SD-CARD." The system control unit 207 then grays out the menu item "SD-CARD" among the displayed menu items "CF-A," "CF-B," and "SD-CARD," and displays the menu item "SD-CARD" as selected. As a result, the user can recognize that the menu assigned to the shortcut key is "SD-CARD," and that the menu "SD-CARD" is not able to be opened since the menu "SD-CARD" is currently unavailable.

Figure 5:
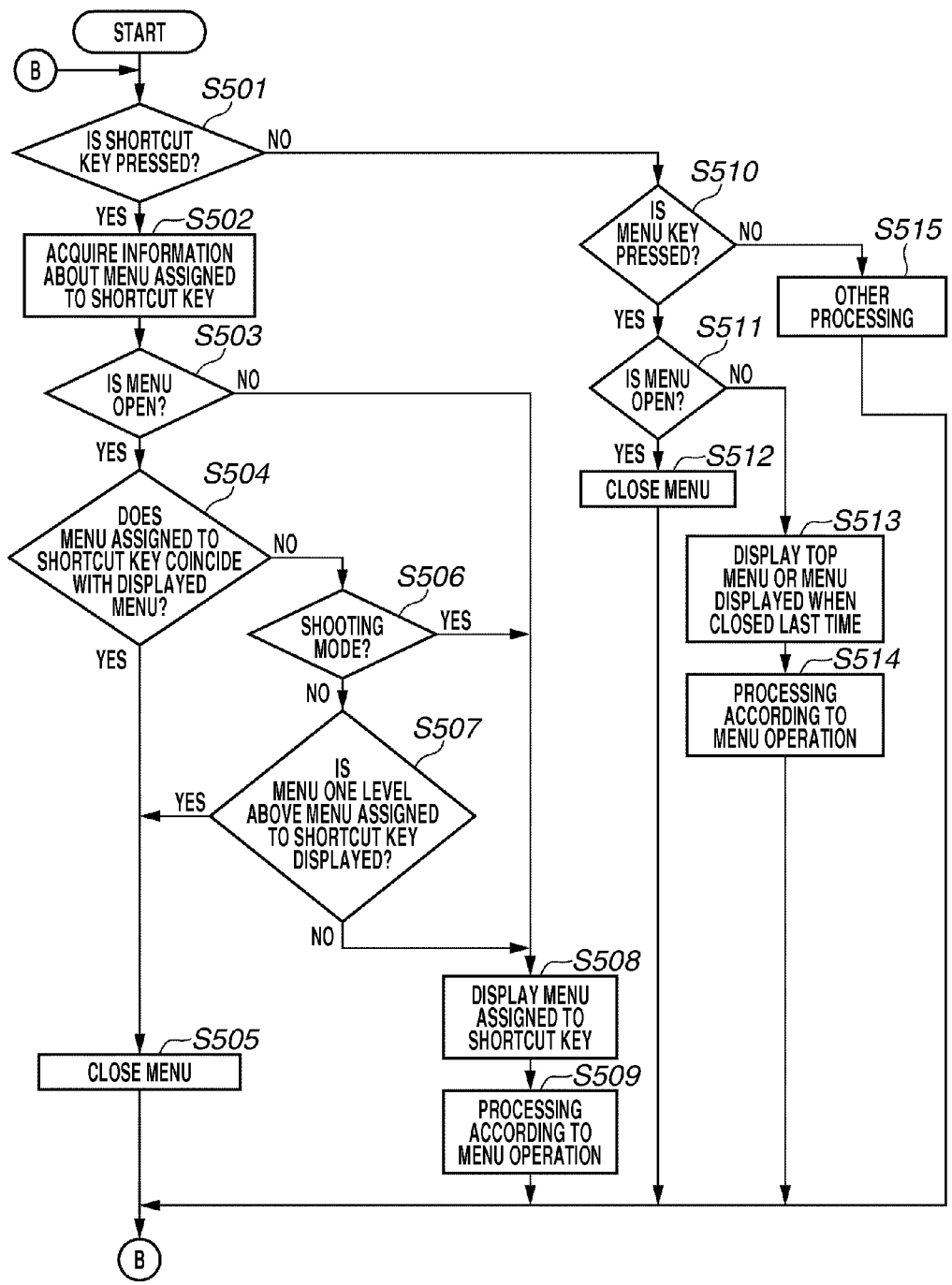
FIG. 5 is a flowchart illustrating menu display processing according to a second exemplary embodiment.

A second exemplary embodiment will be described. In the second exemplary embodiment, when a shortcut key is pressed, the system control unit 207 performs the operation for closing a menu if a menu one level above the menu assigned to the shortcut key is open, aside from the condition described in the first exemplary embodiment. The system control unit 207 also performs different operations depending on whether the operation state of the digital video camera 100 is in a shooting mode (still image shooting mode or moving image shooting mode) or other than a shooting mode (for example, playback mode). The digital video camera 100 according to the present exemplary embodiment is similar to those described in the first exemplary embodiment with reference to FIGS. 1 up to 3A to 3C. Description thereof will thus be omitted. FIG. 5 is a flowchart illustrating menu display processing according to the second exemplary embodiment. The processes of the flowchart are implemented by the system control unit 207 loading the program recorded in the nonvolatile memory 210 into the system memory 212 and executing the program.

The processing of steps S501 to S505 illustrated in FIG. 5 is similar to that of the foregoing steps S401 to S405 illustrated in FIG. 4, respectively. Description thereof will thus be omitted. In step S506, the system control unit 207 determines whether the current operation mode of the digital video camera 100 is a shooting mode. If the current operation mode is a shooting mode (YES in step S506), the system control unit 207 proceeds to step S508. If the current operation mode is not a shooting mode (NO in step S506), the system control unit 207 proceeds to step S507. Examples of the operation mode other than a shooting mode include a playback mode.

In step S507, the system control unit 207 compares the menu assigned to the shortcut key acquired in step S502 with the currently displayed menu. The system control unit 207 initially determines whether the currently displayed menu is the menu one level above the menu assigned to the shortcut key. The system control unit 207 further determines whether the currently displayed menu is in a state where the menu item for opening the menu assigned to the shortcut key is selected among a plurality of menu items.

For example, if the menu assigned to the shortcut key is "SD-CARD" described above, the system control unit 207 determines whether the menu "reset" one level above, not the menu "SD-CARD" itself, is open. The system control unit 207 determines that the menu "reset" is open, and further determines whether the menu item "SD-CARD" is selected among the displayed menu items "CF-A," "CF-B," and "SD-CARD." Possible situations where the menu item "SD-CARD" is selected include when the user has just finished an operation on the menu "SD-CARD" and when the user has pressed the set key and is about to make an operation on the menu "SD-CARD." In such cases, the user need not intentionally open the menu "SD-CARD" with the shortcut key. The user's pressing operation on the shortcut key is thus considered to be made for a purpose other than opening the menu "SD-CARD."

In the present exemplary embodiment, the pressing operation on the shortcut key in such situations is considered to be made to close the menu, not to call the shortcut destination. The system control unit 207 then performs control to close the menu. Note that such a control is exercised only when not in a shooting mode. If the determination in step S507 is YES, the system control unit 207 proceeds to step S505 to close the menu. On the other hand, if the determination in step S507 is NO, the system control unit 207 proceeds to step S508. In step S508, the system control unit 207 opens the menu assigned to the shortcut key.

The processing of step S509 is similar to that of the foregoing step S407 illustrated in FIG. 4. The processing of steps S510 to S515 is similar to that of the foregoing steps S408 to S413 illustrated in FIG. 4, respectively. Description thereof will thus be omitted.

As described above, in the second exemplary embodiment, the system control unit 207 performs control to close a menu if a shortcut key is pressed in the following case. Specifically, the digital video camera 100 is not in a shooting mode, the displayed menu is one level above the menu assigned to the shortcut key, and the menu item for opening the menu assigned to the shortcut key is selected. Consequently, the system control unit 207 closes a menu when the user presses a shortcut key immediately after an operation on the menu assigned to the shortcut key has finished or if the menu assigned to the shortcut key can be opened in one operation without pressing the shortcut key. Such a control can further improve the user-friendliness.

Shooting is a top priority to image capturing apparatuses like the digital video camera 100. If menu settings need to be changed during intervals between shots, it is important to quickly switch to the menu. In a shooting mode, higher priority is thus given to opening a menu. When the user presses a shortcut key, the system control unit 207 then performs control to open the menu assigned to the shortcut key, not to close a menu, even if the menu one level above the menu assigned to the shortcut key is displayed.

The determination of step S506 illustrated in FIG. 5 of the present exemplary embodiment may be omitted so that if the determination in step S504 is NO, the system control unit 207 proceeds to step S507. The determination of step S507 illustrated in step S507 may be omitted so that if the determination in step S506 is NO, the system control unit 207 proceeds to step S508.

A third exemplary embodiment will be described. Suppose that the user selects a menu item to make an apparatus setting or an operation instruction. Such a setting or an operation instruction may be enabled or disabled depending on the operation state of the apparatus. If the selected setting or operation instruction is disabled, it is controlled such that menu is not displayed even if the menu item is selected. As a result, even if the user operates the shortcut key to which the shortcut function is assigned, the assigned menu will not be displayed. In other words, since the user operates a shortcut key and no shortcut function comes into operation, there is the problem that the user is not able to determine whether the selected setting or operation instruction is disabled or the shortcut key is malfunctioning. Another problem is that even when the user operates an external key in attempting to check a setting state of the apparatus, the setting state cannot be checked by using the shortcut key if the setting or operation instruction is disabled.

The third exemplary embodiment and a fourth exemplary embodiment to be described later will deal with a configuration that makes the user recognize that a setting or an operation instruction by a menu assigned to a shortcut key is disabled, thereby preventing the misrecognition that the shortcut key is malfunctioning.

Figure 6:
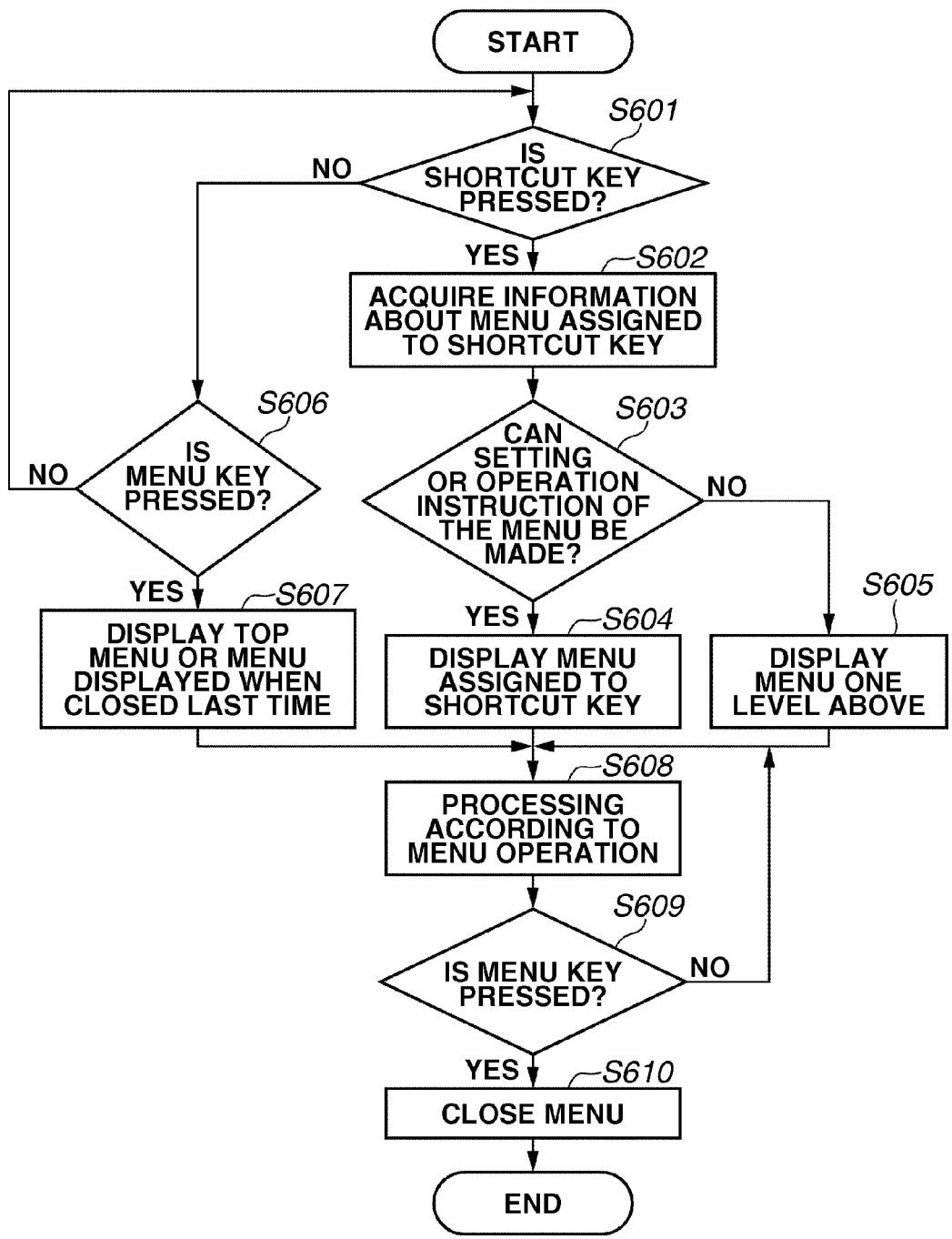
FIG. 6 is a flowchart illustrating menu display processing according to a third exemplary embodiment.

The third exemplary embodiment deals with the operation of the digital video camera 100 that can prevent the misrecognition that a shortcut key is malfunctioning when a setting or an operation instruction of the menu assigned to the shortcut key is disabled. The digital video camera 100 according to the present exemplary embodiment and display examples of the menus are similar to those of the first exemplary embodiment described with reference to FIGS. 1 up to 3A to 3C. Description thereof will thus be omitted. FIG. 6 is a flowchart illustrating menu display processing according to the third exemplary embodiment. The processes of the flowchart are implemented by the system control unit 207 loading the program recorded in the nonvolatile memory 210 into the system memory 212 and executing the program.

In step S601, the system control unit 207 detects whether the user presses a shortcut key of the operation unit 104. If the system control unit 207 detects that any one of the plurality of shortcut keys is pressed (YES in step S601), the system control unit 207 proceeds to step S602. On the other hand, if the system control unit 207 does not detect that a shortcut key is pressed but detects an operation on other than the shortcut keys (NO in step S601), the system control unit 207 proceeds to step S606.

In step S602, the system control unit 207 acquires information about the menu assigned to the shortcut key pressed in step S601 from the shortcut function information recorded in the backup memory 211. The system control unit 207 further acquires a condition that disables a setting or an operation instruction of the assigned menu (hereinafter, referred to as a setting disabling condition), and proceeds to step S603.

In step S603, the system control unit 207 determines whether the setting disabling condition acquired in step S602 is satisfied, i.e., whether a setting or an operation instruction of the menu assigned to the shortcut key acquired in step S602 can be made. If a setting or an operation instruction can be made (YES in step S603), the system control unit 207 proceeds to step S604. If no setting or operation instruction can be made (NO in step S603), the system control unit 207 proceeds to step S605. In step S604, the system control unit 207 displays the menu corresponding to the menu information acquired in step S602 on the display unit 101. For example, a menu screen like illustrated in FIG. 3A or 3B is displayed on the display unit 101.

In step S605, the system control unit 207 displays a menu one level above the menu corresponding to the menu information acquired in step S602 on the display unit 101. Here, the system control unit 207 displays the menu item for entering the menu assigned to the shortcut key acquired in step S602 as selected among the menu items displayed on the menu one level above. The system control unit 207 also displays recognizably to the user that the selected menu item is currently not settable. For example, the system control unit 207 displays the menu item in a different display form like grayout.

Figure 7:
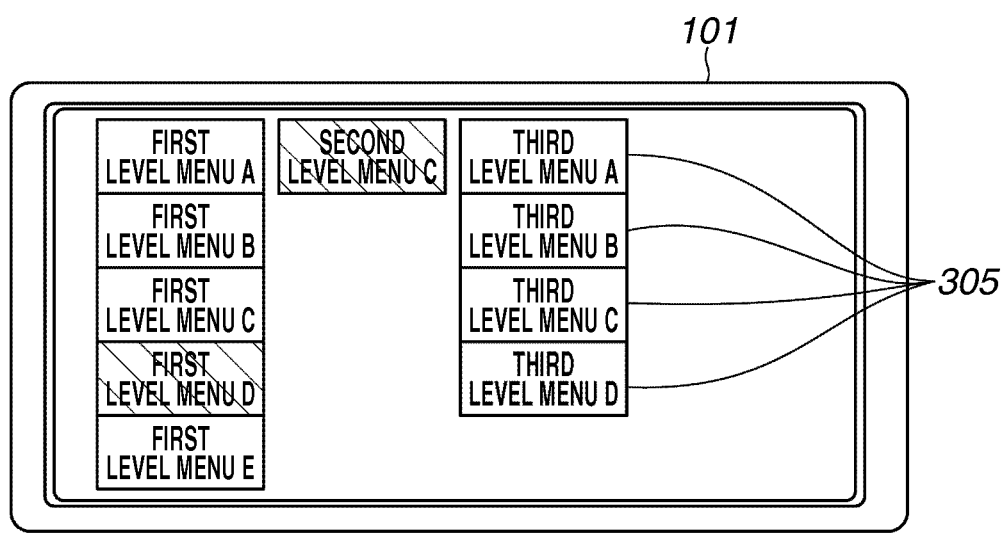
FIG. 7 is a diagram illustrating a display example of a menu screen.

FIG. 7 illustrates a display example where the menu assigned to the shortcut key is "third level menu D," and a setting or an operation instruction of the menu "third level menu D" is determined to be not able to be made. In FIG. 7, the menu "second level menu C" one level above the menu "third level menu D" is displayed. Among the menu items "third level menu A" to "third level menu D," the menu item "third level menu D" for entering the menu "third level menu D" is grayed out to recognizably display the disabled state. In such a state, the system control unit 207 will not enter the menu "third level menu D" even if the user presses the set key.

For example, suppose that the foregoing menu "SD-CARD" is assigned to the shortcut key and there is no SD card inserted. In such a case, no setting can be made on the menu "SD-CARD." The system control unit 207 therefore opens the menu "reset" one level above the menu "SD-CARD." The system control unit 207 then grays out the menu item "SD-CARD" among the displayed menu items "CF-A," "CF-B," and "SD-CARD," and displays the menu item "SD-CARD" as selected. As a result, the user can recognize that the menu assigned to the shortcut key is "SD-CARD," and that the menu "SD-CARD" is not able to be opened because the menu "SD-CARD" is currently unavailable.

In step S606, the system control unit 207 detects whether the user presses the menu key of the operation unit 104. If the menu key is pressed (YES in step S606), the system control unit 207 proceeds to step S607. If the menu key is not pressed (NO in step S606), the system control unit 207 returns to step S601. In step S607, the system control unit 207 displays the top menu or the menu that was previously displayed when closed last time. Specifically, if the user presses the menu key for the first time after the digital video camera 100 is powered on, the system control unit 207 opens the top menu. If not, the system control unit 207 opens the menu that was previously displayed when closed last time. For the sake of such processing, the system control unit 207, when closing a menu, records the information about the menu previously displayed into the system memory 212.

In step S608, the system control unit 207 performs processing according to operations the user makes via the operation unit 104 (menu operations). Specifically, when the user operates the up and down arrow keys to select a menu item and presses the set key, the system control unit 207 executes the selected menu item. More specifically, if the selected menu item is a menu of the lowest hierarchy, the system control unit 207 reflects the setting value or executes an operation instruction indicated by the menu item. If the selected menu item is not a menu of the lowest hierarchy, the system control unit 207 opens the menu of lower hierarchy corresponding to the selected menu item. If the selected menu item is a return button, the system control unit 207 opens a menu of higher hierarchy.

In step S609, the system control unit 207 detects whether the user presses the menu key of the operation unit 104. If the menu key is pressed (YES in step S609), the system control unit 207 proceeds to step S610. If the menu key is not pressed (NO in step S609), the system control unit 207 returns to step S608. In step S610, the system control unit 207 closes and hides (clears the display of) the displayed menu, returns to a display state prior to the menu display, and ends the processing.

As described above, in the third exemplary embodiment, when a shortcut key is pressed, the system control unit 207 displays a menu regardless of whether a setting or an operation instruction of the menu assigned to the shortcut key can be made. In other words, a menu can be opened even if no setting or operation instruction of the menu assigned to the shortcut key is able to be made. Here, it can be recognizably displayed for user recognition that no setting or operation instruction by the menu assigned to the shortcut key is able to be made. This can prevent user's misrecognition that the shortcut key is malfunctioning, like the menu is not properly registered to the shortcut key or the shortcut key is broken.

Figure 8:
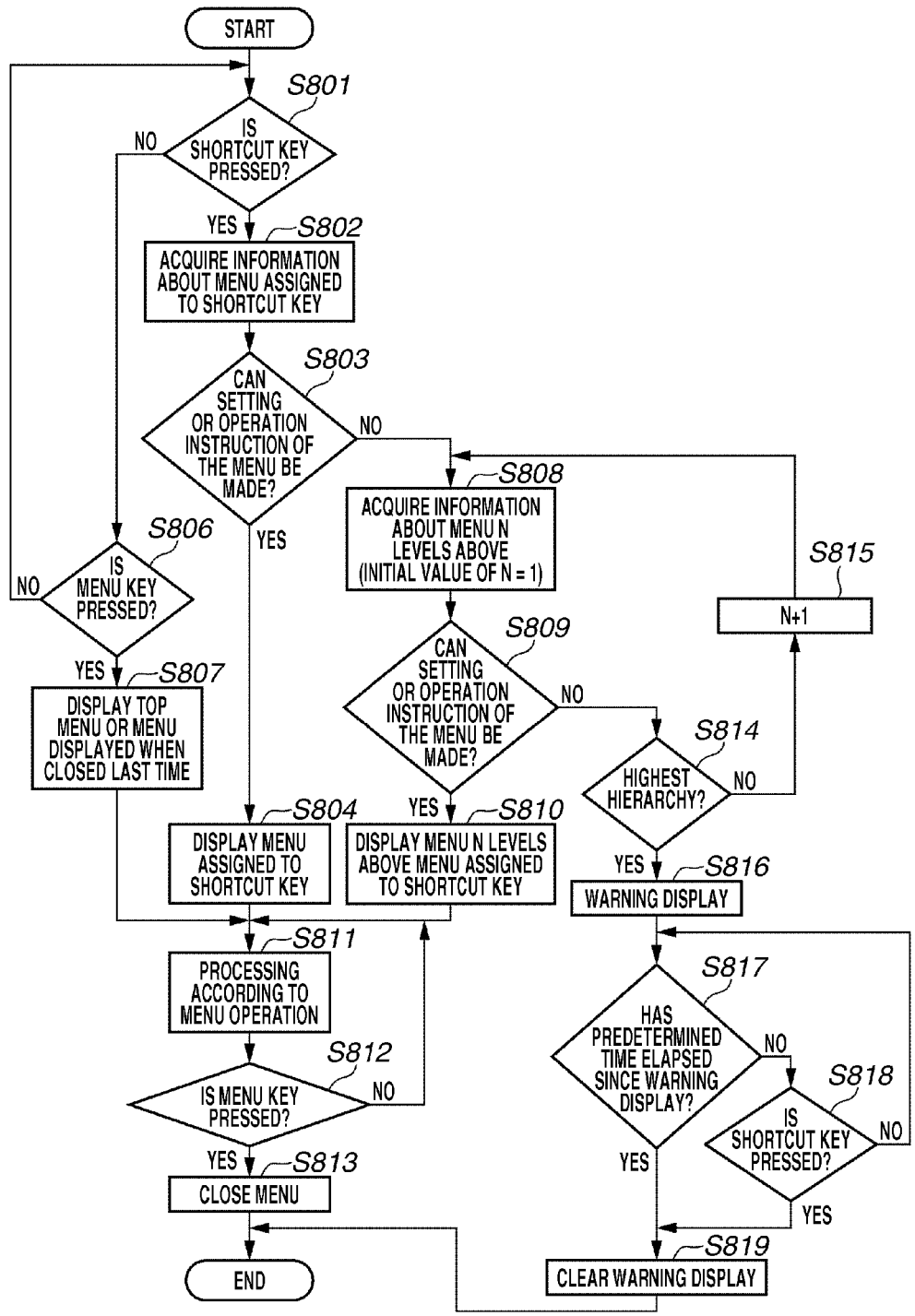
FIG. 8 is a flowchart illustrating menu display processing according to a fourth exemplary embodiment.

A fourth exemplary embodiment will be described. In the fourth exemplary embodiment, if no setting or operation instruction of a menu assigned to a shortcut key can be made and no setting or operation instruction of a menu one level above the menu can be made, a menu of yet higher hierarchy is displayed. The digital video camera according to the present exemplary embodiment is similar to that described in the first exemplary embodiment with reference to FIGS. 1 up to 3A to 3C. Description thereof will thus be omitted. FIG. 8 is a flowchart illustrating menu display processing according to the fourth exemplary embodiment. The steps of the flowchart are implemented by the system control unit 207 loading the program recorded in the nonvolatile memory 210 into the system memory 212 and executing the program.

The processing of steps S801 to S804, S806, and S807 illustrated in FIG. 8 is similar to that of steps S601 to S604, S606, and S607 illustrated in FIG. 6, described in the first exemplary embodiment, respectively. Description thereof will thus be omitted. In step S808, the system control unit 207 acquires information about a menu N (initial value of N=1) levels above the menu acquired in step S802, and a setting disabling condition. In step S809, the system control unit 207 determines whether the setting disabling condition acquired in step S808 is satisfied, i.e., whether a setting or an operation instruction of the menu N levels above the menu acquired in step S802 can be made. If a setting or an operation instruction can be made (YES in step S809), the system control unit 207 proceeds to step S810. If no setting or operation instruction can be made (NO in step S809), the system control unit 207 proceeds to step S814.

In step S810, the system control unit 207 displays the menu N levels above the menu acquired in step S802 on the display unit 101. The system control unit 207 then proceeds to step S811. The processing of steps S811 to S813 is similar to that of steps S608 to S610 illustrated in FIG. 6, described in the first exemplary embodiment, respectively. Description thereof will thus be omitted. In step S814, the system control unit 207 determines whether the menu acquired in step S808 is the menu of the highest hierarchy, i.e., the top menu. If the menu is of the highest hierarchy (YES in step S814), the system control unit 207 proceeds to step S816. If the menu is not of the highest hierarchy (NO in step S814), the system control unit 207 proceeds to step S815.

In step S815, the system control unit 207 adds 1 to N to ascend the hierarchy by one level. The system control unit 207 then proceeds to step S808. In step S816, the system control unit 207 displays a warning display on the display unit 101 that there is no menu including a menu item on which a setting or an operation instruction can be made, like "No shortcut function is available." In step S817, the system control unit 207 counts the display time of the warning display displayed in the step S816, and determines whether a predetermined time has elapsed. If a predetermined time has elapsed (YES in step S817), the system control unit 207 proceeds to step S819. If the predetermined time has not elapsed yet (NO in step S817), the system control unit 207 proceeds to step S818.

In step S818, the system control unit 207 detects whether the user presses a shortcut key of the operation unit 104. If the system control unit 207 detects that a shortcut key is pressed (YES in step S818), the system control unit 207 proceeds to step S819. If the system control unit 207 does not detect that a shortcut key is pressed (NO in step S818), the system control unit 207 returns to step S817. In step S818, the system control unit 207 may determine whether the user presses the same shortcut key as that pressed in step S801. In step S819, the system control unit 207 hides (clears the display of) the warning display on the display unit 101, and ends the menu display processing.

As described above, in the fourth exemplary embodiment, if the setting or operation instruction of a menu assigned to a shortcut key is disabled, the system control unit 207 displays a menu of higher hierarchy. Here, the system control unit 207 ascends the hierarchy up to a menu where a setting or an operation setting is enabled. In other words, if the setting or operation setting of the menu assigned to the shortcut key is disabled, the system control unit 207 displays a menu of the lowest hierarchy that includes a menu item on which a setting or an operation instruction can be made, among menus of higher hierarchy than the menu assigned to the shortcut key. The user can thus omit operations to open a menu that includes a menu item on which a setting or an operation instruction is able to be made, and can quickly enter the menu. This can further improve the user-friendliness.

The foregoing exemplary embodiments have dealt with the cases where a shortcut function is assigned to and used from a shortcut key serving as a specific key. However, an exemplary embodiment of the present invention is not limited thereto. Specifically, similar effects to those described above can be obtained if a shortcut key whose menu assignment is not changeable is applied to the exemplary embodiment.

The foregoing control of the system control unit 207 according to the exemplary embodiments may be implemented by a single piece of hardware. Alternatively, a plurality of pieces of hardware may share the processing to control the entire apparatus. While the present invention has been described based on its advantageous exemplary embodiments, the present invention is not limited to such specific exemplary embodiments. Various forms not departing from the gist of the invention are also embraced in the present invention. The foregoing exemplary embodiments are just a few exemplary embodiments of the present invention. The exemplary embodiments may be combined as appropriate.

The foregoing exemplary embodiments have been described by using as an example the case where the present invention is used for a digital video camera. An exemplary embodiment of the present invention is not limited thereto, and may be applied to a display control apparatus that displays a specific menu among hierarchical menus including a plurality of menus by an operation of a specific operation unit. More specifically, an exemplary embodiment of the present invention may be applied to a personal computer, a personal digital assistant (PDA), a mobile phone terminal, a portable image viewer, a printer apparatus equipped with a display, a digital photo frame, a music player, a game machine, an electronic book reader, and a tablet terminal.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-237500 filed Oct. 28, 2011 and No. 2011-237501 filed Oct. 28, 2011, which are hereby incorporated by reference herein in their entirety.

What is claimed is:

1. A display control apparatus comprising:
a specific operation unit configured to display a specific menu from a plurality of menus that are hierarchically structured and configured to make a setting or an operation instruction about the display control apparatus, wherein the specific menu is a menu other than a first level menu; and
a memory and at least one processor which function as:
a display control unit configured to perform control,
wherein, in a case where the specific operation unit is operated when it is determined that none of the plurality of menus is displayed on a display unit, the display control unit is configured to perform control to display the specific menu,
wherein, in a case where the specific operation unit is operated when it is determined that the specific menu is displayed on the display unit, the display control unit is configured to perform control to clear display of the specific menu,
wherein, in a case where the specific operation unit is operated when it is determined that a different menu that is different from the specific menu is displayed and an above menu, positioned one hierarchical level above the specific menu, is not displayed, the display control unit is configured to perform control to display the specific menu, and
wherein, in a case where the specific operation unit is operated to display the specific menu on the display unit and it is determined that the specific menu is disabled, the display control unit is configured to display the above menu and recognizably display that a menu item for entering the specific menu is disabled.

2. The display control apparatus according to claim 1, wherein, in a case where the specific operation unit is operated when it is determined that the above menu is displayed on the display unit and a menu item in the above menu for entering the specific menu is selected, the display control unit is configured to perform control to clear the display of the above menu.

3. The display control apparatus according to claim 2, wherein, in a case where the specific operation unit is operated when it is determined that the above menu is displayed on the display unit and the menu item for entering the specific menu is not selected, the display control unit is configured to perform control to display the specific menu.

4. The display control apparatus according to claim 2, further comprising:
an image capturing unit; and
a setting unit configured to set anyone of a plurality of operation modes including a shooting mode in which the image capturing unit captures an image,
wherein, in a case where the specific operation unit is operated and the shooting mode is set by the setting unit, the display control unit is configured to display the specific menu, even when it is determined that the above menu is displayed on the display unit and the menu item for entering the specific menu is selected.

5. The display control apparatus according to claim 1, wherein, in a case where the specific operation unit is operated when it is determined that the different menu is displayed, the display control unit is configured to perform control to display the specific menu.

6. The display control apparatus according to claim 1, wherein, in a case where it is determined that the specific menu is cleared, the display control unit is configured to perform control to restore a display state of the display unit to that before the plurality of menus are opened.

7. The display control apparatus according to claim 1, further comprising an assignment unit configured to assign any one of the plurality of menus to the specific operation unit as the specific menu based on a user's operation.

8. The display control apparatus according to claim 1, further comprising a plurality of specific operation units, wherein different menus are assigned to the respective plurality of the specific operation units.

9. The display control apparatus according to claim 1, further comprising a menu operation unit configured to display the different menu.

10. The display control apparatus according to claim 9, wherein, in a case where the menu operation unit is operated, the display control unit is configured to display a first level menu from the plurality of menus.

11. The display control apparatus according to claim 9, wherein, in a case where the menu operation unit is operated, the display control unit is configured to display a menu previously displayed when it is determined that the display of the specific menu is cleared last time from the plurality of menus.

12. The display control apparatus according to claim 1, wherein the display control apparatus is configured to function as an image capturing apparatus including an image capturing unit configured to convert an optical image into an electrical signal.

13. The display control apparatus according to claim 1, wherein, in a case where the specific operation unit is operated when it is determined that the different menu and the above menu is displayed, the display control unit performs control to display the specific menu regardless of which menu, other than the specific menu and the above menu, is currently displayed.

14. The display control apparatus according to claim 1, further comprising a determination unit configured to determine, in a case where the specific operation unit is operated, whether a currently displayed menu is the specific menu,
wherein, in a case where the determination unit determines that the currently displayed menu is the specific menu, the display control unit performs control to clear display of the currently displayed menu, and
wherein, in a case where the determination unit determines that the currently displayed menu is not the specific menu, the display control unit performs control to display the specific menu.

15. The display control apparatus according to claim 1, further comprising a determination unit configured to determine, in a case where the specific operation unit is operated, whether a currently displayed menu is either the specific menu or the above menu, wherein, in a case where the determination unit determines that the currently displayed menu is either the specific menu or the above menu, the display control unit performs control to clear display of the currently displayed menu, and wherein, in a case where the determination unit determines that the currently displayed menu is neither the specific menu nor the above menu, the display control unit performs control to display the specific menu.

16. A method for controlling a display control apparatus, the method comprising:

displaying, by an operation of a specific operation unit, a specific menu from a plurality of menus that are hierarchically structured and configured to make a setting or an operation instruction about the display control apparatus, wherein the specific menu is a menu other than a first level menu; and performing display control, wherein, in a case where the specific operation unit is operated when it is determined that none of the plurality of menus is displayed on a display unit, performing display control includes performing control to display the specific menu, wherein, in a case where the specific operation unit is operated when it is determined that the specific menu is displayed on the display unit, performing display control includes performing control to clear display of the specific menu, wherein, in a case where the specific operation unit is operated when it is determined that a different menu that is different from the specific menu is displayed and an above menu, positioned one hierarchical level above the specific menu, is not displayed, performing display control includes performing control to display the specific menu, and wherein, in a case where the specific operation unit is operated to display the specific menu on the display unit and it is determined that the specific menu is disabled, the display control unit is configured to display the above menu and recognizably display that a menu item for entering the specific menu is disabled.

17. A non-transitory computer-readable recording medium storing a program for causing a computer to perform a method for controlling a display control apparatus, the method comprising:

displaying, by an operation of a specific operation unit, a specific menu from a plurality of menus that are hierarchically structured and configured to make a setting or an operation instruction about the display control apparatus, wherein the specific menu is a menu other than a first level menu; and performing display control, wherein, in a case where the specific operation unit is operated when it is determined that none of the plurality of menus is displayed on a display unit, performing display control includes performing control to display the specific menu, wherein, in a case where the specific operation unit is operated when it is determined that the specific menu is displayed on the display unit, performing display control includes performing control to clear display of the specific menu, wherein, in a case where the specific operation unit is operated when it is determined that a different menu that is different from the specific menu is displayed and an above menu, positioned one hierarchical level above the specific menu, is not displayed, performing display control includes performing control to display the specific menu, and wherein, in a case where the specific operation unit is operated to display the specific menu on the display unit and it is determined that the specific menu is disabled, the display control unit is configured to display the above menu and recognizably display that a menu item for entering the specific menu is disabled.

18. A display control apparatus comprising:

a specific operation unit configured to display a specific menu from a plurality of menus that are hierarchically structured and configured to make a setting or an operation instruction about the display control apparatus, wherein the specific menu is a menu other than a first level menu; and a memory and at least one processor which function as:

a display control unit configured to perform control, wherein, in a case where the specific operation unit is operated when it is determined that a setting or an operation instruction by the specific menu is able to be made, the display control unit is configured to perform control to display the specific menu on a display unit, and wherein, in a case where the specific operation unit is operated when it is determined that no setting or operation instruction by the specific menu is able to be made, the display control unit is configured to perform control to display, on the display unit, a menu at a level in the hierarchy that is higher than the specific menu in such a manner that a menu item for entering the specific menu is recognizably displayed as disabled and the menu item for entering the specific menu is not settable.

19. The display control apparatus according to claim 18, further comprising an assignment unit configured to assign any one of the plurality of menus to the specific operation unit as the specific menu based on a user's operation.

20. The display control apparatus according to claim 18, further comprising a plurality of specific operation units, wherein different menus are assigned to the respective plurality of specific operation units.

21. The display control apparatus according to claim 18, wherein the display control unit is configured to display the menu item in grayout to recognizably display that the menu item for entering the specific menu is disabled.

22. The display control apparatus according to claim 18, wherein, in a case where the specific operation unit is operated when it is determined that no setting or operation instruction by the specific menu is able to be made, the display control unit is configured to perform control to display, on the display unit, an above menu, positioned one hierarchical level above the specific menu, in such a manner that a menu item of the above menu, whose setting or operation instruction is not able to be made, is recognizably displayed as disabled.

23. The display control apparatus according to claim 22, wherein, in a case where the specific operation unit is operated when it is determined that no setting or operation instruction by the specific menu is able to be made and when the above menu includes no menu item whose setting or operation instruction is able to be made, the display control unit is configured to display a menu two hierarchical levels above the specific menu in such a manner that a menu item, of the menu two hierarchical levels above the specific menu and whose setting or operation instruction is not able to be made, is recognizably displayed to be disabled.

24. The display control apparatus according to claim 18, wherein, in a case where the specific operation unit is operated when it is determined that no setting or operation instruction by the specific menu is able to be made, the display control unit is configured to display a menu of a lowest hierarchy, which includes a menu item whose setting or operation instruction is able to be made from menus of higher hierarchy that are higher than the specific menu, in such a manner that a menu item, of the displayed menu of the lowest hierarchy and whose setting or operation instruction is not able to be made, is recognizably displayed to be disabled.

25. The display control apparatus according to claim 24, wherein, in a case where it is determined that a menu of a highest hierarchy from the menus of higher hierarchy that are higher than the specific menu includes no menu item whose setting or operation instruction is able to be made, the display control unit is configured to display a warning on the display unit that there is no menu including a menu item whose setting or operation instruction is able to be made.

26. The display control apparatus according to claim 25, wherein, in a case where the specific operation unit is operated, the display control unit is configured to clear display of the warning.

27. The display control apparatus according to claim 18, further comprising a menu operation unit configured to display, from the plurality of menus, a menu that is different from the specific menu.

28. The display control apparatus according to claim 27, wherein, in a case where the menu operation unit is operated, the display control unit is configured to display a menu of the highest hierarchy.

29. The display control apparatus according to claim 27, wherein, in a case where the menu operation unit is operated, the display control unit is configured to display a menu previously displayed when display of the menu is cleared last time.

30. The display control apparatus according to claim 18, wherein the display control apparatus is configured to function as an image capturing apparatus including an image capturing unit configured to convert an optical image into an electrical signal.

31. A method for controlling a display control apparatus, the method comprising:

displaying, by an operation of a specific operation unit, a specific menu from a plurality of menus that are hierarchically structured and configured to make a setting or an operation instruction about the display control apparatus, wherein the specific menu is a menu other than a first level menu; and performing display control, wherein, in a case where the specific operation unit is operated when it is determined that a setting or an operation instruction by the specific menu is able to be made, performing display control includes performing control to display the specific menu on a display unit, and wherein, in a case where the specific operation unit is operated when it is determined that no setting or operation instruction by the specific menu is able to be made, performing display control includes performing control to display, on the display unit, a menu at a level in the hierarchy that is higher than the specific menu in such a manner that a menu item for entering the specific menu is recognizably displayed as disabled and the menu item for entering the specific menu is not settable.

32. A non-transitory computer-readable recording medium storing a program for causing a computer to perform a method for controlling a display control apparatus, the method comprising:

displaying, by an operation of a specific operation unit, a specific menu from a plurality of menus that are hierarchically structured and configured to make a setting or an operation instruction about the display control apparatus, wherein the specific menu is a menu other than a first level menu; and performing display control, wherein, in a case where the specific operation unit is operated when it is determined that a setting or an operation instruction by the specific menu is able to be made, performing display control includes performing control to display the specific menu on a display unit, and wherein, in a case where the specific operation unit is operated when it is determined that no setting or operation instruction by the specific menu is able to be made, performing display control includes performing control to display, on the display unit, a menu at a level in the hierarchy that is higher than the specific menu in such a manner that a menu item for entering the specific menu is recognizably displayed as disabled and the menu item for entering the specific menu is not settable.

* * * * *